United States Patent [19]
Enos et al.

[11] Patent Number: 5,892,175
[45] Date of Patent: Apr. 6, 1999

[54] HIGH MODULUS PRESSURE SEAL

[76] Inventors: James W. Enos, 1 Welch Way, East Freetown, Mass. 02717; Raymond H. Saraiva, 120 Washington St., Fairhaven, Mass. 02719

[21] Appl. No.: 783,712

[22] Filed: Jan. 16, 1997

Related U.S. Application Data

[60] Provisional application No. 60/0130,173 Jan. 17998,

[51] Int. Cl.[6] ................................................. H02G 15/06
[52] U.S. Cl. ........................................................ 174/65 R
[58] Field of Search .............................. 174/65 R, 65 SS, 174/65 G, 93

[56] References Cited

U.S. PATENT DOCUMENTS

| | | | |
|---|---|---|---|
| 4,368,214 | 1/1983 | Gillette | 174/117 F |
| 4,859,812 | 8/1989 | Klosin et al. | 174/135 |
| 5,451,717 | 9/1995 | Itou | 174/77 R |

*Primary Examiner*—Bot L. Ledynh
*Assistant Examiner*—Joseph Waks
*Attorney, Agent, or Firm*—Robert J. Doherty

[57] ABSTRACT

A system for the water tight sealing of an electrical service cable to a receptacle box wherein a cap having a top with an under sized opening therethrough for the receipt of the cable is molded from a high modulus thermosetting rubber-like material which exhibits a high degree of elastic memory which assures the continual exertion of force upon the cable which creates an effective seal without any accessory equipment or materials.

20 Claims, 5 Drawing Sheets

HIGH MODULUS PRESSURE SEAL

This application claims the benefit of Provisional Application Ser. No. 60/010,173 filed Jan. 18, 1996.

BACKGROUND AND OBJECTS OF THE INVENTION

This invention relates to a device for providing a water tight seal between an electrical service cable as it enters the electrical service box mounted on an exterior surface of a house or other structure.

There is a long felt need to achieve a water tight seal between the electrical service cable and a meter box or other entrance box through which the cable enters the house or other structure and is interiorly connected to various circuits therein through an electrical panel box. In many cases, an adequate rain tight seal is not afforded between the entrance box entering the structure and the service cable and thus water enters the box and travels along the cable and into the interior electrical panel either directly shorting circuits or causing excessive rusting which eventually can cause the same problem. This situation can lead to a loss of power and more seriously to electrically caused fires, in fact, knowledgeable building inspectors attribute a high percentage of electrical fires caused in houses and other structures to this water leakage problem. Obviously, it would be desirable to avoid this problem by forming a water tight seal between the incoming electrical cable and the entrance box, and various attempts along this line have been made.

The most common attempt to solve the problem is to utilize silicone sealer, exterior caulking, duct sealer and many various potting compounds which are applied to the cable and over the mechanical attachment fitting which connects the cable to the entrance box and formed into a mountain or mound shape hoping it will shed water and become water tight. In many cases due to hot and cold temperatures creating expansion and contraction causes the sealing material to separate from the cable or because of ozone or ultraviolet sun light damage to the sealers cause them to dry up and deteriorate, various conditions are set up by which water can enter the interior panels and create dangerous conditions. In addition, the mechanical fitting used to mechanically attach the cable to the entrance box usually includes a rubber gland and compression fitting having a pair of laterally separated wings which receive the cable and which are tightened thereon with the use of screw threads and even though utilized in many instances in an attempt to achieve a weather tight connection between the service cable and the entrance box are not generally recognized as suitable for such purpose due primarily to the wide shape and tolerance variations permitted in the formation of various entrance service cable especially those of higher amperages, e.g., 100 amps and higher. These cables are generally of elongated flattened ovoid shape and often take the form of a figure eight in cross sectional configuration. Such elongated shapes that are subject to numerous size variations present an extremely difficult sealing task much more difficult and of a different scope than providing a seal between circular cable and an entrance box.

Various other attempts have been made to form water tight connective seals between cable members and downstream equipment to which they are attached including the common expedient of inserting a soft rubber insert between two members which are then tightened or providing a soft rubber member which engages a cable or wire but such latter concept as illustratively shown in U.S. Pat. No. 5,224,875 issued Jul. 6, 1993 is limited to cylindrical wires which are relatively easy to form a seal with respect to and even includes the use of a flexible diaphragm through which the wire or cable may extend through such as in the configuration depicted in U.S. Pat. No. 3,792,415 issued Feb. 12, 1974.

The above indicated attempts whether theoretically or actually in use do not, however, result in the desired water tight fit between the electrical service cable and the box to which it is attached to under actual field conditions. Accordingly, the need remains for a practical, low cost solution for this long standing industry problem.

SUMMARY OF THE INVENTION

The present invention accomplishes the above-indicated objects by the provision of a cap or boot-like device having a top wall fitted with an opening downwardly extending therethrough through which the cable is forcibly fitted and thereafter the cable appropriately mechanically and electrically connected with the inlet box. The top wall of the cap device includes an upper surface having a peripheral extent generally circular from which a side wall downwardly extends so as to provide a rain deflecting surface for the device. The top wall is imperforate except for the cable receiving opening therethrough and is formed from an extremely high modulus thermosetting rubber material which exhibits a high degree of elastic memory such that when initially or otherwise distorted, it continually and over long periods of time measured in scores of years exerts a force urging its return to the original as molded unstressed, distorted or flexed position. Accordingly by placing at least one and preferably two or more reduced dimension sealing beads in the inner periphery of the inlet opening which are spaced vertically from each other or by otherwise making the inlet opening of a dimension significantly less than that of the outside surface of the cable but in the same general configuration, then a continual force can be exerted against the outside surface of the cable by such sealing beads which will serve to form a water tight connection therebetween without any other apparatus being utilized, that is, without the use of clamps, crimped sleeves or any other attendant equipment which requires periodic adjustment or inspection. Also dependent upon the cable utilized and its size and surface irregularities, the material from which the cap of the present invention is formulated can be adjusted so as to achieve the necessary force that is required to provide the desired water tight seal. Also, such formulation includes the incorporation of suitable materials so as to provide for ozone or ultraviolet light protection such that the cap device of the present invention retains its desired characteristics over long time periods and does not require inspection or replacement even when subjected to extremes in weather conditions.

These and other objects of the present invention are accomplished by a coupling structure for receiving and sealing a length of cable in fluid tight relation, said structure comprising a cap having a thick top having an upper surface having at least a portion thereof being a generally flat surface and a lower surface generally parallel to and vertically spaced from said upper generally flat surface portion by the thickness of said top, said top having a single vertically oriented opening therethrough, said opening defined by vertically oriented walls extending through said top generally flat surface portion between said upper and lower top surfaces, said top opening having at least one peripheral pressure application bead inwardly laterally extending from said opening defining walls, said cable having a non-circular, elliptical cross-sectional configuration and said opening of a cross-sectional shape similar to that of said cable but of smaller dimensions such that there is an interference fit between the outside surface of the cable and the inside surfaces of the top opening when the cable is received therein, said top molded of a high modulus rubber-like compound having limited deformation and having an elastic memory such that the outward deformation of said opening inside surfaces sets up a force reservoir in the material of said top such that said top continually urges the opening back to its original as molded dimensions so as to continually squeeze the outer surface of said cable, said opening entirely within the vertical extent of said top wherein the entire force laterally forces said opening inside surfaces against said cable.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 2:
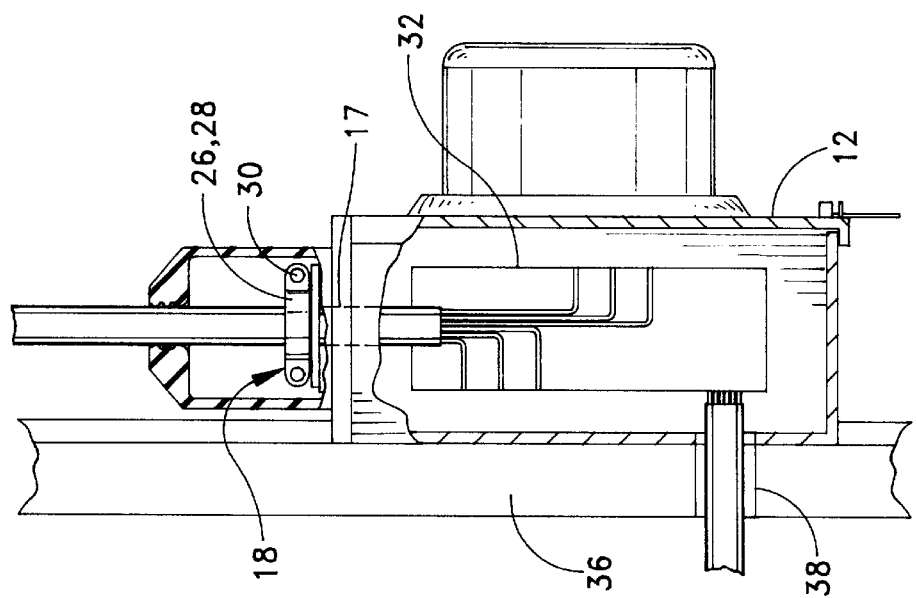
FIG. 2 is partial side sectional view taken along the line 2—2 of FIG. 1.
Figure 1:
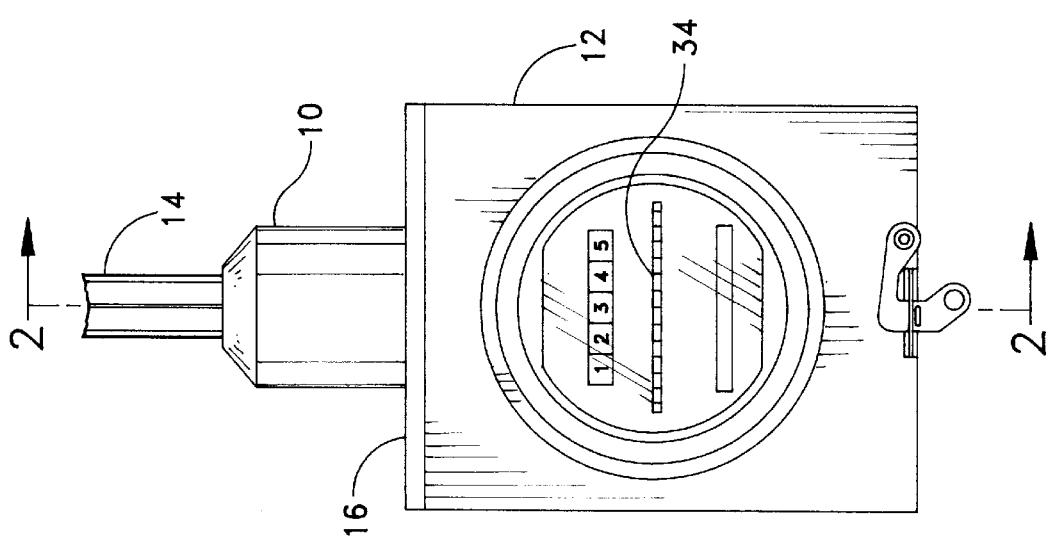
FIG. 1 is a front elevational view showing a typical meter box attached to the wall of a structure such as a house, etc. and to which an electrical service cable is connected in a water tight manner by the cap device of the present invention shown in its operable position.
Figure 8:
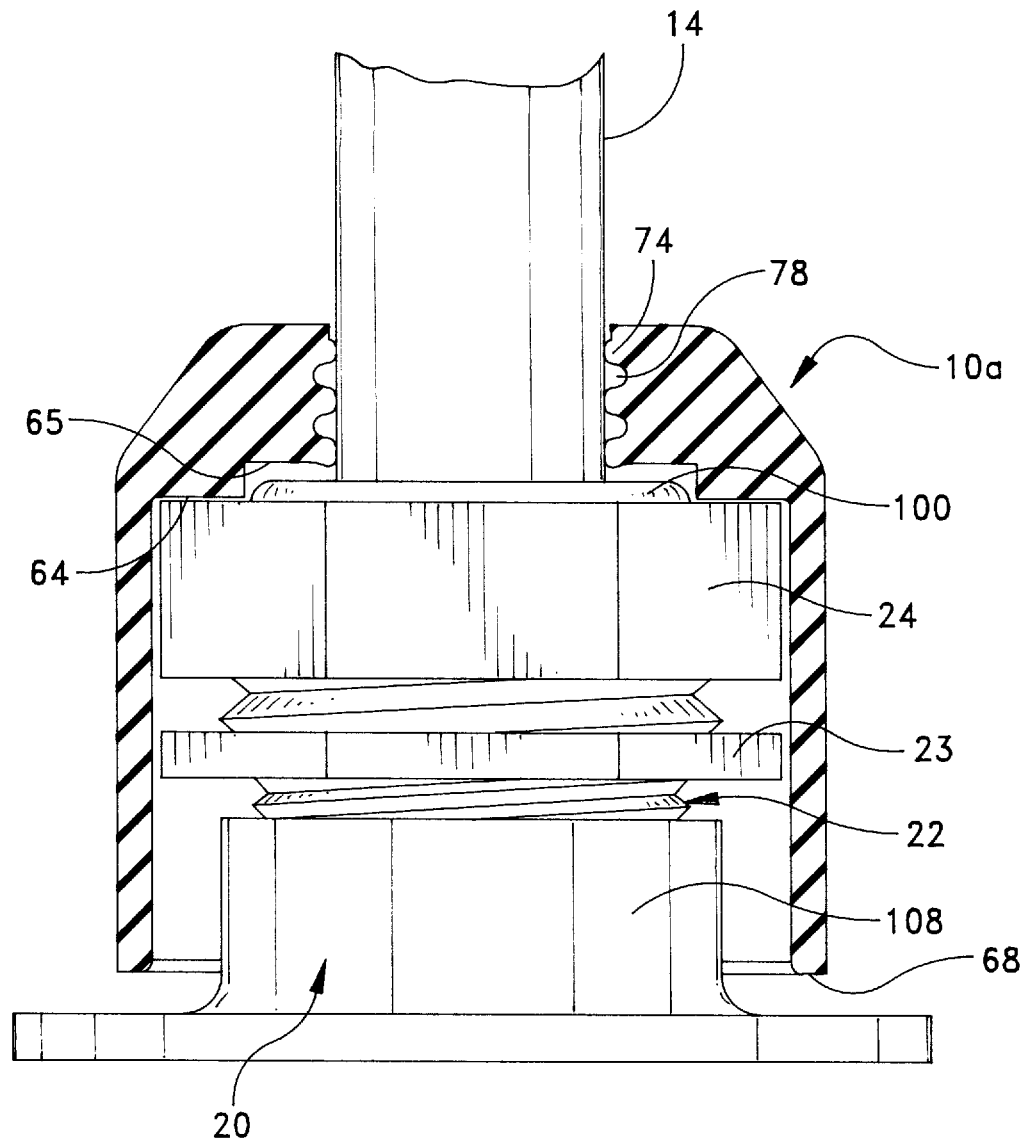
FIG. 8 is a side sectional view of a slightly modified form of the invention in which a lower countersink in the top wall of the device has been provided to accommodate various attachment devices utilized to mechanically attach the cable to the entrance box and also shows an embodiment in which the sealing beads at not distorted quite to the extent as shown in FIG. 7.

Referring now to the drawings and particularly to FIGS. 1 and 2 thereof, the cap device 10 of the present invention is shown mounted upon the typical meter box 12 through which an electrical service cable 14 is mechanically and electrically connected. As best shown in FIG. 2, the cable 14 extends downwardly along the outer surface of a structure such as a house or other building and passes through the device 10 and into the meter box 12 through the upper wall 16 thereof. Such upper wall 16 is provided with an opening 17 through which a standard mechanical connector 18 can be partially inserted. The connector 18 includes a downwardly extending threaded boss which extends through the opening 17 and which is threadably connected to a lower nut. A second nut engages the upper surface of the top wall and completes the attachment of the boss to the box 12. In addition, a pair of front and rear flanges 26, 28 respectively in turn connected to the boss are utilized to fixedly engage the outer surface of the cable when the screws 30 are tightened such that the cable is mechanically affixed to the box 12. It should be brought out that other mechanical and electrical methods of connecting the cable 14 to a meter box or other entrance box which permits the entrance of the cable to interior portions of the structure may be utilized, and it is really the structure and manner of utilizing that device of the present invention so as to assure a water tight seal between the cable 14 and outlet box regardless of its construction that is the primary concern with the present invention. For instance, such a modified connection is shown in FIG. 8 wherein a connector 20 includes an upstanding boss 22 on which nuts 23, 24 are threaded, the upper nut 24 supporting the cap.

Most meter boxes also include some type of electrical connection where the amount of electrical usage is recorded via a meter device 32 including a display 34 and thence the cable or a connector thereto extends inwardly through the wall 36 via an opening 38 and thence to an electrical circuit or service panel box (not shown) but routinely mounted in interior portions of the structure such as upon a wall, and it is this structure which is primarily the concern of the present invention, that is, it is important to prevent water from leaking into the receptacle box or meter box 12 and thence downwardly along the path formed by the cable or cable extension into the interior service panel box.

Figure 3:
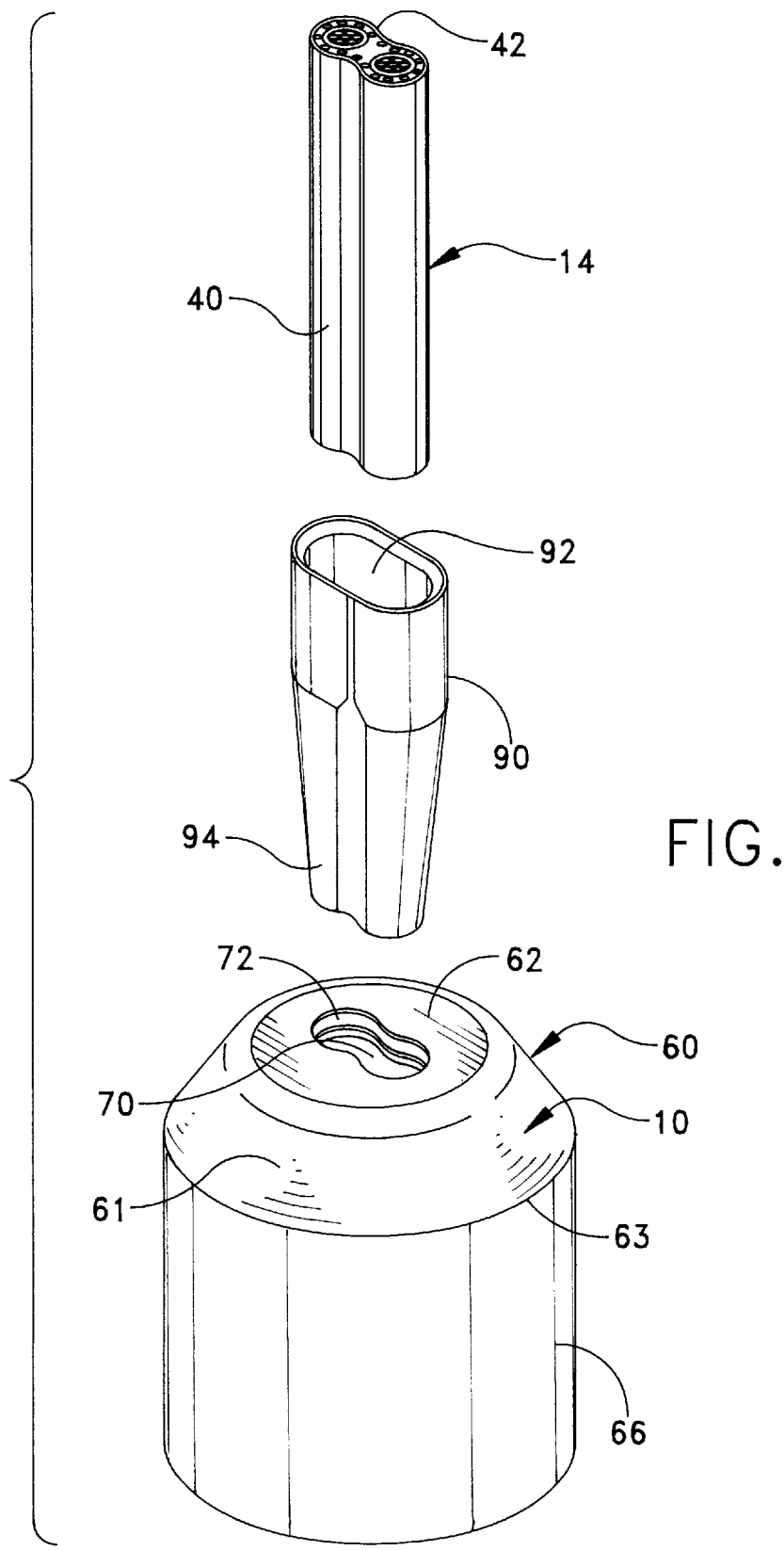
FIG. 3 is an exploded isometric view showing the manner in which t service entrance cable is assembled to the cable seal cap device of the present invention.

As best shown in FIG. 3, the manner in which the service entrance cable 14 can be attached to the cap device 10 of the present invention is best illustrated as is the standard shape of the cable 14. Such shape is of an elongated semi-elliptical form which can and often does assume a somewhat figure eight configuration in cross-sectional depiction and conventionally includes a number of wire cables or bundles coated with an internal resinous or plastic covering 40 and also with an outer jacket 42 also normally of a hardened plastic material. This outer jacket as well as the overall dimensions of the cable are subject to size variations depending upon the particular manufacturer and can also include dimpled, wrinkled and otherwise imperfect surface irregularities which make sealing thereon extremely difficult as contrasted to the relatively easy sealing task presented by a circular cable or other member that has a circular cross section and which requires a fluid tight seal thereagainst. Specifically, it should be brought out that while the present invention is primarily intended for electrical service cable that it is also useful for use with other elongated members that need to be sealed against fluid penetration there past whether such fluid is water, oil, gas, grease or the like. Thus the term cable as utilized herein includes such other non-electrical service cables so long as such cable meets the overall physical requirements intended, that is, non-circular and of a somewhat elongated ovoid configuration and exhibiting a generally elliptical peripheral configuration with no sharp corners and of an overall curvilinear outline.

Turning now to the structure of the cap 10 itself, it will be apparent that such includes a relatively thick top wall 60 having an upper surface 62 and an opposed lower or inner surface 64. The top wall 60 further includes an outer periphery 63 from which a water shedding skirt 66 downwardly extends. Such skirt may be of a significant vertical dimension or in some cases may be a very minor extent or even nonexistent in some other cases dependent on the particular physical environment by which the cable 14 is connected to the box or other structure and the physical properties of the cable 14 and/or cap 10. Preferably, the cap 10 is of an overall semi-cylindrical shape configuration and is provided with an outwardly downwardly flared outer secondary portion 61 of the top wall to aid in rain deflection from the interior portions of the connector box 12. In addition, the skirt 66 can terminate in a lower peripheral edge 68 adapted to rest upon the upper surface 16 of the box 12 or in some cases especially wherein the lower wall 64 of the top rests or otherwise contacts some portion of the connector 24 itself may be spaced therefrom although it is intended that in most cases the height of the skirt 66 provided in commercial applications will be long enough to provide for contact with the lower edge 68 and the box surface 16 in the intended manner. It should also be pointed out that the point of water entrance that the present invention is primarily concerned with is between the cable 14 and the cap 10 as it extends through the top wall 60 thereof rather than water potentially entering the box 12 via the opening 18 which is usually blocked in other effective manners.

The top wall 60 is provided with a single downwardly extending vertically oriented opening 70. The cross-sectional configuration of the opening 70 is patterned after that of the cross-sectional configuration of the cable 14 but may be slightly smaller in dimension. The opening 70 is provided with an internal wall 72 which further includes at least one and preferably two or more series of peripheral beads 74 which inwardly extend from the surface 72 and are coextensive with the entire periphery of such surface 72. Between each of the beads 74 which further include outer rounded terminal portions 76 preferably of lesser height than that at the root of the bead is a deflection void 78 which are of peripheral configuration similar to that of the sealing beads but inwardly extending into the interior portions of the internal wall a distance approximately equal to the distance that the sealing beads outwardly extend from such interior wall 72. These deflection voids 78 are provided for the purpose of permitting an area or path of material movement when the sealing beads are outwardly deflected by the surface of the cable 14 when such is forced through the opening 70 upon installation. Such installation is illustrated by example in FIG. 3. It should also be pointed out that while the beads necessarily define an entrance space between their opposed portions that is less than the corresponding contacting portions of the cable, that the interior wall may also be of slightly lesser space dimensions than the corresponding cable dimensions in which case the entire opening 70 would have to be deflected outwardly to receive the cable.

Figure 7:
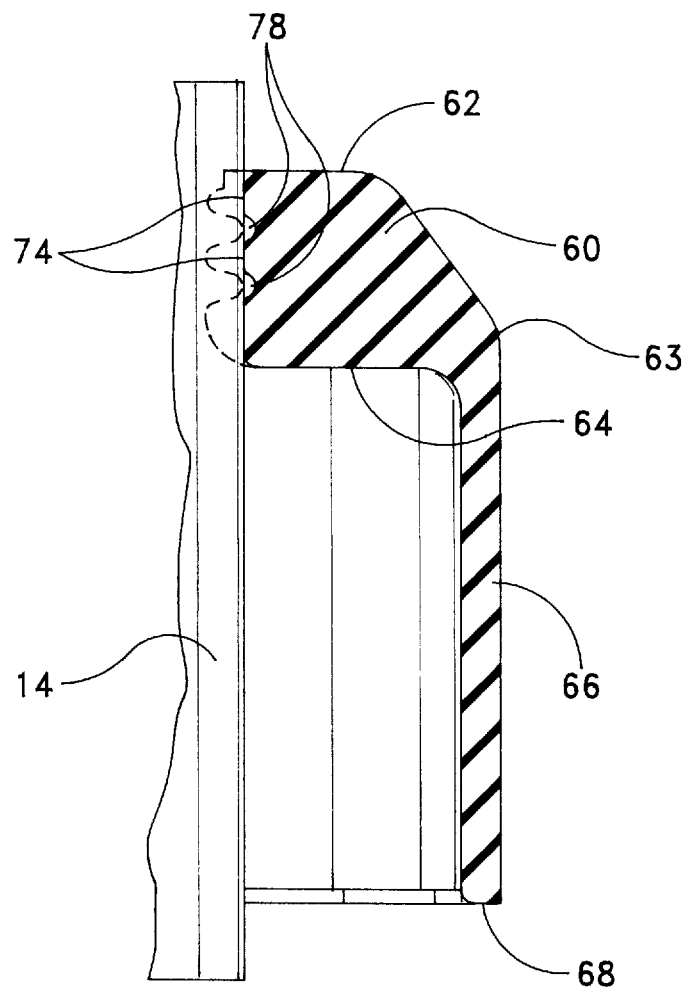
FIG. 7 is a partial side view similar to FIG. 6 but showing a portion of the cable in place and the deformation of the sealing beads.

Referring to FIG. 3 when it is desired to force the service entrance cable 14 through the opening 70, it is preferred to utilize a plastic assembly tool 90 of a generally wedge shaped overall configuration and having a top entrance 92 for receipt of the terminal end of the cable 14. Thereafter the cable, the narrowed dimensioned forward wedge shape end 94 of the tool 90 and the opening 70 are lubricated by any suitable standard lubricant and then the cable and tool forcibly downwardly pushed through the opening 70 at which time the sealing beads and possibly the walls 72 are outwardly deflected to the position shown in FIG. 7 until the assembly tool 90 along with an adequate length of cable 14 extends into the interior portions of the cap 10 such that the necessary connections within the receptacle box can be facilitated by the electrician. The lubricant is preferably of the type that air evaporates under normal ambient conditions in a matter of two or three days such that the lubricating effect is removed, and thereafter it would be nearly impossible to physically remove the service cable from the cap 10 or at least extremely difficult to do so in an unlubricated state—the size differences between the outer surface cable 14 and the inner surface 70 of the opening as well as the high bulk modulus of the material from which the cap 10 is formed being suitably determined and compounded to accomplish such purpose.

Referring to FIG. 8, a modified form of the cap structure 10a is shown wherein the lower wall 64 is provided with a countersink 65 into which a portion of a modified form connector assembly 20 may extend thereinto and to which a steel compression cap 100 which is entrapped by an upper hex nut 24 threadably connected to a shank or boss 22 in turn attached to an upwardly extending threaded portion 25 from an electrical connector or hub 108. In addition, FIG. 8 shows a modified form of the beads at least to the extent that they are deflected considerably less than that shown in FIG. 7 which can be because of a slightly smaller dimension of the outside surfaces of the cable 14 or by compounding the top wall including, of course, the sealing beads of a much higher bulk modulus material such that much less flexibility and deflection can be achieved.

Figure 4:
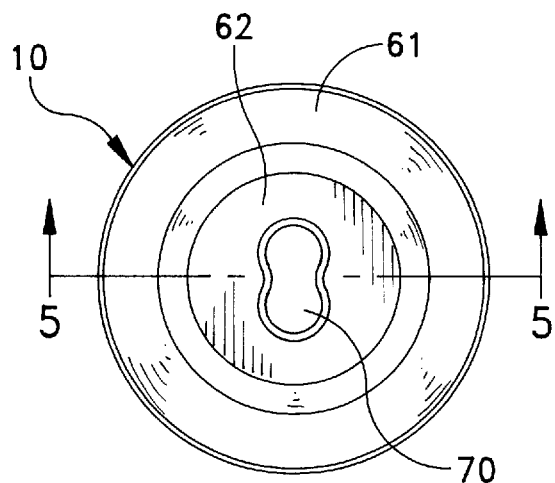
FIG. 4 is top plan view of the cap device of the present invention.
Figure 5:
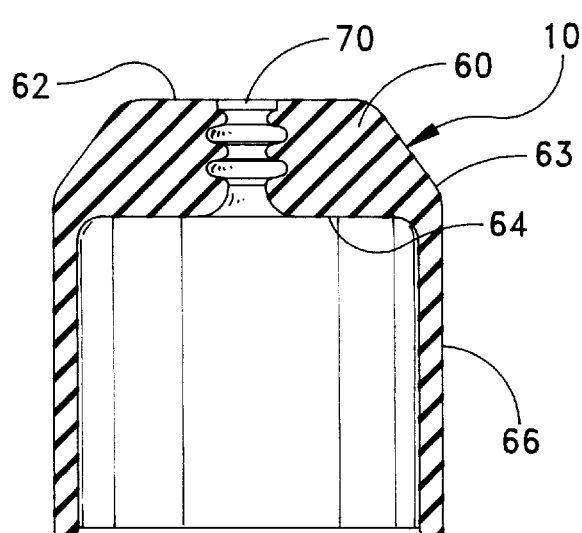
FIG. 5 is a side sectional view thereof taken along the line 5—5 of FIG. 4.
Figure 6:
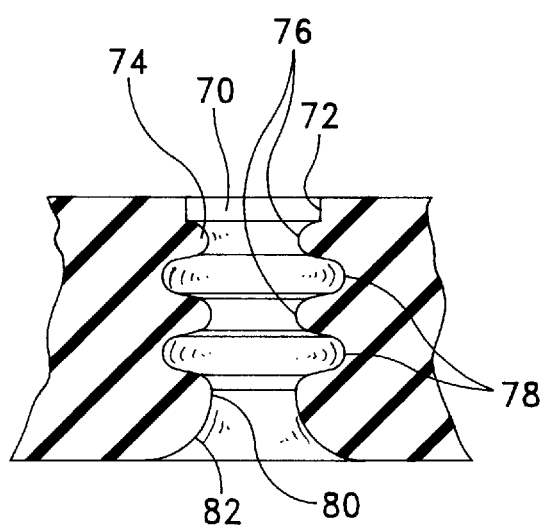
FIG. 6 is an enlarged sectional view of a portion of FIG. 5 showing the preferred construction of the sealing bead.

It is believed that a suitable water tight seal can be formed between the cap 10 and the cable 14 when at least a closure force of 100 P.S.I. is exerted against the cable. In the cable configuration depicted in the drawings which is illustrative of one form in which the cable cross-sectional configuration may take, that is, of a modified figure eight shape, a dimension of approximately 11 millimeters across one of the enlarged nodes thereof along the line A—A of FIG. 4 and corresponding to the diameter at that section of the lateral distance between the wall 70 and with an inward projection of each bead 72 approximately 1 millimeter so that there is approximately a 2 millimeter difference between the outer dimension of the cable which approximates that of the lateral opening dimension of the wall 70 with two regular sealing beads and a third partial sealing bead 80 formed at the upper end of a lower fillet construction 82 along with a use of the following thermoset material was found to produce the desirable sealing force approximately in the 100 P.S.I. range. The partial bead 80 with its rounded fillet lower wall merging into the lower surface of the top adds bulk and strength much like desirable weld configurations and is believed to contribute to an increased memory effect as well. Such custom formulated thermoset material chosen was an ethylene-propylene-dieneterpolymer (E.P.D.M.). The base material is called Nordel and can be purchased from Dupont Chemical of Wilmington, Del. The actual physical properties were as follows:

| ACTUAL PHYSICAL PROPERTIES | | | |
|---|---|---|---|
| Physical Properties | A.S.T.M. Designation | Actual | Requirements |
| Durometer Shore "A" | D2240 | 75 | 70 +/− 5 |
| Durometer, I.R.H.D. | D1415 | 75 | 70 +/− 5 |

-continued

ACTUAL PHYSICAL PROPERTIES

| Physical Properties | A.S.T.M. Designation | Actual | Requirements |
| --- | --- | --- | --- |
| Tensile Strength P.S.I. Min. | D412 | 2400 | 2000 P.S.I.Min. |
| Ultimate Elongation % | D412 | 190% | 175% |
| Min. Modulus at 100% P.S.I. Min. | D412 | 750 P.S.I. | 700 P.S.I. Min. |
| Die Tear "C" P.S.I Min. | D624 | 175 P.S.I. | 150 P.S.I. Min. |

A25 - Test Method D 865, 70 Hours at 125° C./257° F.
   #1. Change in Hardness, Max, Points + 10.
   #2. Change in Tensile strength, Max, %, −20%.
   #3. Change in Ultimate Elongation, Max, %, −40%.
C32 - Resistance to Ozone, Test Method D1171,
   Exposure Method "B"
   #1. Stretch for 24 hours prior to ozone testing.
   #2. Test at 50 PPHM ozone.
   #3. 40° C./104° F.
   #4. No cracks under 2X magnification.
F18 - Low-Temperature Brittleness Test Methods D2137,
   Method "A", 9.3.2., Non-Brittle after 3 Min., at
   −50° C./−58° F.

In addition to creating an interference fit as above described, it is important that the material utilized have a high modulus believed to be approximately 700 P.S.I. minimum such that a constant force is applied to the outside of the cable via the sealing beads during the useful life of the device which can be 40, 50 or so years and that the material be of the type that has a definite plastic memory, that is, when deflected will continually seek to return to its undeflected or "as molded" state and thus insure a continual force application to the outside wall of the cable thus assuring the constant pressure to insure a fluid tight sealing effect desired throughout the life of the product. It is also believed important and necessary that the sealing beads be uninterrupted along their peripheral extent and that they be laterally oriented approximately in line with the lateral extent of the relatively flat top wall which, of course, must be of a dimension large enough to achieve enough mass of material to insure such high modulus force effect. In the molded sample tested, the outer diameter of the skirt 66 was approximately 6 centimeters while the thickness of the top wall approximately 1½ centimeters, and the top wall was entirely solid except for the opening 70 as intended. It is also believed important that the deflection voids 78 be present and adjacent each of the sealing beads 74 and be of such an extent that permits material deflection of the beads into such voids. Thus by using a suitable thermoset material which possesses a high modulus and the plastic memory characteristics necessary and combining such with a large mass in the top wall, enough force is created to obtain the necessary high pressure on the sealing beads which translates into the necessary water tight seal between such beads and the outside surface of the cable. In effect, the solid mass of the top creates an energy or force reservoir great enough so that it does not materially deflect but continually assists in urging the beads and in those cases where the internal wall is deflected, the wall as well to their undistorted positions. Such reservoir, of course, takes the essential shape of the top, i.e., essentially rectangular or trapezoidal, when the secondary top wall is utilized and, accordingly, the reservoir is essentially laterally outwardly offset from the sealing beads which in turn are entirely within the vertical confines of the solid reservoir mass. This relationship of having essentially all of the top, in essence, directly in line and in back of the sealing beads enables the bulk of the energy reservoir to be available for continually exerting the inner wall opening surfaces and including the beads back to their original undistorted form which in turn is believed to contribute to the desirable application of sealing force to the cable. By doing such, a wide range of cable sizes can be accommodated by formulating such material to obtain high ozone resistance, excellent weathering properties with both high and low temperature ranges and to be puncture resistant and accompanying high dielectric properties, the cap device of the present invention can easily outlast the useful life of the electrical service cable it is designed to seal.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A coupling structure for receiving and sealing a length of cable in a fluid tight relation, said structure comprising a cap having a thick top having a vertically oriented thickness and further having an upper surface having at least a portion thereof being a generally flat surface and a lower surface generally parallel to and vertically spaced from said upper generally flat surface portion by a distance defining a thickness of said top, said top having a single vertically oriented opening therethrough, said opening defined by a vertically oriented wall extending through said portion being said generally flat surface between said upper and lower top surfaces, said opening having at least one peripheral pressure application bead inwardly laterally extending from said wall, said length of cable having a non-circular, elongated flattened ovoid outside surface shape resembling a figure eight in a cross-sectional configuration and said opening of a cross-sectional shape similar to that of said length of cable but of overall smaller dimensions such that there is a generally equal interference fit between a portion of an entire outside surface of the length of cable and an inside surface of the top opening when the length of cable is received therein, said top molded of a high modulus rubber-like compound having a bulk modulus of at least 700 PSI and having a limited deformation and having a compression set such that an outward deformation of said bead by a portion of said length of cable sets up a force reservoir in the material of said top such that said top continually urges the opening back to its original as molded dimensions so as to continually contact and squeeze of the entire outer surface of said portion of said length of cable that extend through said top, said opening positioned entirely within the vertical thickness of said top, said upper surface having an outer periphery from which a side wall downwardly extends, said side wall and said lower surface forming an interior cavity for receiving a portion of a cable, said cap being cylindrical and said top being circular, said top generally of a trapezoidal vertical cross-sectional shape.

2. The structure of claim 1, said opening including at least one peripheral deflection void laterally outwardly extending from said opening wall and vertically adjacent said at least one bead.

3. The structure of claim 2, said cap having at least two vertically separated pressure application beads.

4. The structure of claim 3, wherein said limited deformation of said opening is entirely by said beads.

5. The structure of claim 3, wherein the deformation of said opening is by both said vertically oriented wall and said beads.

6. An improved electrical service receiving assembly comprising a service box having an upper wall provided with an opening through which a running length of a vertically oriented electrical cable having a forward end extends for disposition of said forward end within an interior of said box, a cap mounted on said cable in a water tight sealing relationship with said cable at a cable portion above and adjacent said box upper wall of said box and mechanical connection means for attaching said cable to said box, said cap having a thick top having a vertically oriented thickness and further having an upper surface having at least a portion thereof being a generally flat surface and a lower surface generally parallel to and vertically spaced from said upper generally flat surface portion by a distance defining said thickness of said top, said top having a single vertically oriented opening therethrough, said opening defined by a vertically oriented wall extending through said portion being said generally flat surface between said upper and lower top surfaces, said top opening having at least one peripheral pressure application bead inwardly laterally extending from said wall, said cable having a non-circular, elongated flattened ovoid outside surface shape resembling a figure eight in a cross-sectional configuration and said opening having a cross-sectional shape similar to the shape of said cable but of overall smaller dimensions such that there is a generally equal interference fit between an entire outside surface of a portion of the cable that extend through said top and an inside surface of the opening when the cable is received therein, said top molded of a high modulus rubber-like compound having a bulk modulus of at least 700 PSI having a limited deformation and having a compression set such that an outward deformation of said bead by said cable sets up a force reservoir in a material of said top such that said top continually urges the opening back to original as molded dimensions so as to continually contact and squeeze the entire outer surface of said portion of said cable that extends through said top, said opening positioned entirely within the vertical thickness of said top, said upper surface having a peripheral edge from which a side wall downwardly extends, said side wall and said lower surface forming an interior cavity for receiving a portion of said cable and said mechanical connection means, said cap being cylindrical and said top being circular, said top generally of a trapezoidal vertical cross-sectional shape.

7. The structure of claim 6, said opening including at least one peripheral deflection void laterally outwardly extending from said opening wall and vertically adjacent said at least one bead.

8. The structure of claim 7, said cap having at least two vertically separated pressure application beads.

9. The structure of claim 8, wherein said limited deformation of said opening is entirely by said beads.

10. The structure of claim 8, wherein the deformation of said opening is by both said vertically oriented wall and said beads.

11. An improved electrical service receiving assembly comprising a service box having an upper wall provided with an opening through which a running length of a vertically oriented electrical cable having a forward end extends for disposition of said forward end within an interior of said box, a cap mounted on said cable in a water tight sealing relationship with said cable at a cable portion above and adjacent said box upper wall of said box and mechanical connection means for attaching said cable to said box, said cap having a thick top having a vertically oriented thickness and further having an upper surface having at least a portion thereof being a generally flat surface and a lower surface generally parallel to and vertically spaced from said upper generally flat surface portion by a distance defining said thickness of said top, said top having a single vertically oriented opening therethrough, said opening defined by a vertically oriented wall extending through said portion being said generally flat surface between said upper and lower top surfaces, said top opening having at least one peripheral pressure application bead inwardly laterally extending from said wall, said cable having a non-circular.

12. The structure of claim 11, said opening including at least one peripheral deflection void laterally outwardly extending from said opening wall and vertically adjacent said at least one bead.

13. The structure of claim 12, said cap having at least two vertically separated pressure application beads.

14. The structure of claim 13, wherein said limited deformation of said opening is entirely by said beads.

15. The structure of claim 13, wherein the deformation of said opening is by both said vertically oriented wall and said beads.

16. An improved electrical service receiving assembly comprising a service box having an upper wall provided with an opening through which a running length of a vertically oriented electrical cable having a forward end extends for disposition of said forward end within an interior of said box, a cap mounted on said cable in a water tight sealing relationship with said cable at a cable portion above and adjacent said box upper wall of said box and mechanical connection means for attaching said cable to said box, said cap having a thick top having a vertically oriented thickness and further having an upper surface having at least a portion thereof being a generally flat surface and a lower surface generally parallel to and vertically spaced from said upper generally flat surface portion by a distance defining said thickness of said top, said top having a single vertically oriented opening therethrough, said opening defined by a vertically oriented wall extending through said portion being said generally flat surface between said upper and lower top surfaces, said top opening having at least one peripheral pressure application bead inwardly laterally extending from said wall, said cable having a non-circular, elongated flattened ovoid outside surface shape resembling a figure eight in a cross-sectional configuration and said opening having a cross-sectional shape similar to the shape of said cable but of overall smaller dimensions such that there is a generally equal interference fit between an entire outside surface of a portion of the cable that extend through said top and an inside surface of the opening when the cable is received therein, said top molded of a high modulus rubber-like compound having a bulk modulus of at least 700 PSI having a limited deformation and having a compression set such that an outward deformation of said bead by said cable sets up a force reservoir in a material of said top such that said top continually urges the opening back to original as molded dimensions so as to continually contact and squeeze the entire outer surface of said portion of said cable that extends through said top, said opening positioned entirely within the vertical thickness of said top, said upper surface having a peripheral edge from which a side wall downwardly extends, said side wall and said lower surface forming an interior cavity for receiving a portion of said cable and said mechanical connection means, said cap being cylindrical and said top being circular, said cap side wall terminating in a lower peripheral terminal edge, said lower edge contacts said box upper surface.

17. The structure of claim 16, said opening including at least one peripheral deflection void laterally outwardly extending from said opening wall and vertically adjacent said at least one bead.

18. The structure of claim 17, said cap having at least two vertically separated pressure application beads.

19. The structure of claim 18 wherein said limited deformation of said opening is entirely by said beads.

20. The structure of claim 18 wherein the deformation of said opening is by both said vertically oriented wall and said beads.

* * * * *